US008229291B2

(12) United States Patent
Chan

(10) Patent No.: US 8,229,291 B2
(45) Date of Patent: Jul. 24, 2012

(54) RADIATOR APPARATUS

(75) Inventor: Paul Kam Ching Chan, Hong Kong (CN)

(73) Assignee: Worldbest Corporation, Tortola (VG)

( * ) Notice: Subject to any disclaimer, the term of this patent is extended or adjusted under 35 U.S.C. 154(b) by 412 days.

(21) Appl. No.: 12/634,642

(22) Filed: Dec. 9, 2009

(65) Prior Publication Data

US 2010/0084122 A1 Apr. 8, 2010

Related U.S. Application Data

(62) Division of application No. 10/568,780, filed as application No. PCT/CN2004/000098 on Feb. 5, 2004, now Pat. No. 7,805,065.

(51) Int. Cl.
*F21V 7/00* (2006.01)
*A21B 1/00* (2006.01)

(52) U.S. Cl. ........................................ 392/420; 219/405

(58) Field of Classification Search .................. 392/420, 392/421–429; 219/405
See application file for complete search history.

(56) References Cited

U.S. PATENT DOCUMENTS 1,917,461 A 7/1933 Kankin
4,551,617 A 11/1985 Crossley et al.
4,563,572 A 1/1986 Hager, Jr.
4,638,110 A 1/1987 Erbert
4,739,152 A 4/1988 Downs
5,017,940 A 5/1991 Rigollet
5,335,309 A 8/1994 Fujii et al.
5,628,859 A * 5/1997 Janin et al. ................. 156/273.3
5,719,991 A * 2/1998 Sandhu et al. ................ 392/416
6,767,594 B1 * 7/2004 Miroshin et al. ............. 428/1.31
6,845,117 B2 * 1/2005 Wakisaka et al. .......... 372/46.01
7,232,594 B2 * 6/2007 Miroshin et al. ............. 428/1.31
7,684,683 B2 * 3/2010 Yamazaki et al. ............ 392/419
7,805,065 B2 * 9/2010 Chan ............................ 392/420
8,005,352 B2 * 8/2011 Kasai ............................ 392/426
2003/0191459 A1 10/2003 Ganz et al.
2007/0272398 A1 11/2007 Chan

* cited by examiner

*Primary Examiner* — Daniel L Robinson
(74) *Attorney, Agent, or Firm* — Birch, Stewart, Kolasch & Birch, LLP

(57) ABSTRACT

A radiator apparatus for concentrating or dispersing energy. In one embodiment, the radiator includes a thermal conductive layer, a radiation layer, and a thermal insulation layer. The radiation layer is powered by an energy source and includes at least one radiation element embedded in at least a portion of the thermal conductive layer. The thermal insulation layer faces the thermal conductive layer. In another embodiment, the radiator includes a generally helical dome-shaped radiation member powered by an energy source and a generally dome-shaped reflection member including a reflective surface facing the radiation member. In yet another embodiment, the radiator includes a radiation member powered by an energy source and a reflection member having an at least partially ring-shaped concave reflective surface facing the radiation member for distributing energy to an at least partially hat-shaped or ring-shaped area or zone.

8 Claims, 15 Drawing Sheets

RADIATOR APPARATUS

This application is a Divisional of application Ser. No. 10/568,780 filed on Feb. 27, 2007 now U.S. Pat. No. 7,805, 065, which is a National Phase of PCT International Application No. PCT/CN2004/000098 filed on Feb. 5, 2004, which designated the United States, and on which priority is claimed under 35 U.S.C. §120, the entire contents of which are hereby incorporated by reference.

FIELD OF THE INVENTION

This present invention relates to a radiator apparatus. In particular, the present invention relates to a radiator apparatus for concentrating or dispersing energy.

BACKGROUND OF THE INVENTION

The Stefan-Boltzman Law states the total radiation emission for any body at a given temperature as: $R=ECT^4$. E is the emissivity of the body, which is the ratio of the total emission of radiation of such body at a given temperature to that of a perfect blackbody at the same temperature. For a blackbody, which is a theoretical thermal radiating object that is a perfect absorber of incident radiation and perfect emitter of maximum radiation at a given temperature, E=1; for a theoretical perfect reflector, E=0; and for all other bodies $0<E<1$. C is the Stefan-Boltzman constant with a value of approximately $5.67\times10^{-8}$ $W/m^2-K^4$. T is the absolute temperature of the body in degrees Kelvin.

Every object that has a temperature above absolute zero (that is, −273° Celsius) emits electromagnetic radiation. According to Planck's Equation, the radiation emitted by an object is a function of the temperature and emissivity of the object, and the wavelength of the radiation. Irradiation from an object increases with increasing temperature above absolute zero, and quantum energy of an individual photon is inversely proportional to the wavelength of the photon. The Total Power Law states that when radiation is incident on a body, the sum of the radiation absorbed, reflected and transmitted is equal to unity.

Infrared heating is more efficient than conventional heating by conduction and convection in that infrared irradiation can be used in localized heating by directing heat and irradiation towards only the selected space. Infrared irradiation does not heat the air in the selected space, and only heats the objects within that space. In fact, radiation can be transmitted in or through a vacuum without the need of a medium for heat transfer, unlike conventional heating by conduction and/or convection.

SUMMARY OF THE INVENTION

The present invention is directed to a radiator. In one embodiment, the radiator includes a thermal conductive layer, a radiation layer, and a thermal insulation layer. The radiation layer is powered by an energy source and includes at least one radiation element embedded in at least a portion of the thermal conductive layer. The thermal insulation layer faces the thermal conductive layer. The thermal conductive layer may include a metal oxide material. The radiation layer is generally positioned between the thermal insulation layer and the thermal conductive layer. The thermal conductive layer may include a partially spherical or semispherical shape defining a center point or focal zone, while the radiation layer may also include a partially spherical or semispherical shape defining a center point or focal zone. The focal zone of the thermal conductive layer generally coincides with the focal zone of the radiation layer.

A light bulb base may be coupled to the thermal insulation layer of the radiator. The base includes positive and negative contactors electrically connected to the radiation layer of the radiator. The base is adapted to be received in an electrical lamp socket.

In one aspect of this embodiment, the thermal insulation layer may include a concave side facing a convex side of the thermal conductive layer, so that the radiation element of the radiation layer increases temperature of the thermal conductive layer and concentrates energy to the focal zone of the radiation layer. A plurality of optical fibers having a first end may be positioned at the focal zone of the radiation layer for receiving the energy, so that the optical fibers transmit the energy received at the first end to a second end of the optical fibers.

In another aspect of this embodiment, the thermal insulation layer may include a convex side facing a concave side of the thermal conductive layer, so that the radiation element of the radiation layer increases temperature of the thermal conductive layer and disperses energy away from the focal zone of the radiation layer.

In another embodiment, the radiator includes a generally helical dome-shaped radiation member and a generally dome-shaped reflection member including a reflective surface facing the radiation member. The helical dome-shaped radiation member is powered by an energy source. The helical dome-shaped radiation member may include an electrical coil resistance covered by a thermal conductive material. The generally helical dome-shaped radiation member defines a center point or focal zone, while the generally dome-shaped reflection member also defines a center point or focal zone. The focal zone of the radiation member generally coincides with the focal zone of the reflection member.

In one aspect of this embodiment, the reflective surface of the reflection member may include a generally concave shape. The concave reflective surface of the reflection member may face a convex side of the radiation member, so that the radiation member concentrates energy to the focal zone of the radiation member.

In another aspect of this embodiment, the reflective surface of the reflection member may include a generally convex shape. The convex reflective surface of the reflection member may face a concave side of the radiation member, so that the radiation member disperses energy away from the focal zone of the radiation member.

In another embodiment, the radiator used with an astronomic apparatus in Outer Space includes a partially spherical or semispherical structure member defining a center point or focal zone and a radiation layer power by an energy source. The radiation layer is connected to the partially spherical or semispherical structure member. The radiation layer concentrates energy to the focal zone to achieve a temperature differential of the focal zone and an environment of the focal zone and provides a force to the astronomic apparatus and/or an object.

In one aspect of this embodiment, the partially spherical or semispherical structure includes thermal conductive layer and a thermal insulation layer. The thermal insulation layer includes a concave side facing a convex side of the thermal conductive layer. The radiation layer includes at least one radiation element embedded in at least a portion of the thermal conductive layer.

In another aspect of this embodiment, the radiation layer includes a plurality of infrared radiation emitting devices positioned on the concave side of the partially spherical or semispherical structure member.

In another embodiment, the radiator includes a radiation member powered by an energy source and a reflection member including an at least partially hat-shaped or ring-shaped concave reflective surface facing the radiation member for distributing energy to an at least partially ring-shaped area or zone. The radiation member may include an at least partial ring shape and is generally positioned at a center point or focal zone of the reflective surface. The radiation member includes an electrical coil resistance covered by a thermal conductive material.

This invention has an enormously wide scope of objects, applications and users (thus its commercial and industrial value being great) including, but without limitation, focusing, concentrating and directing radiation to or at:

(a) selected area or zone of radiation absorbent surface, object, substance and/or matter on satellite or other astronomic equipment and/or apparatuses in space to achieve an increase in the temperature of such selected area or zone of absorbent surface, object, substance and/or matter relative to its environment or to achieve a temperature differential of said selected area or zone and its environment and providing thrust, torque and propulsion forces in relation to (amongst other things) matters of attitude of satellite or other astronomic equipment and/or apparatuses in space relative to the Sun or other extra-terrestrial body or bodies; and (b) selected radiation absorbent surface, object, substances and/or matter (including, but without limitation, food and other materials) to be manufactured, assembled, installed, erected, constructed, located, repaired, maintained, enjoyed, occupied, consumed, used, or handled (whether indoors or outdoors) by any person, object or thing (including, but without limitation, computerized robotics and cybernetics) in cold weather on Earth, in space or on any other extra-terrestrial or heavenly bodies; and (c) bodies or body tissues (living or dead) or other objects or subjects of scientific research or medical operations and treatments; and food stuffs in cooking and culinary preparations; and (d) objects, substances and/or matters (including, but without limitation, food and other materials) that require an increase in its temperature relative to its environment through focused, concentrated or directed or re-directed radiation.

Figure 1A:
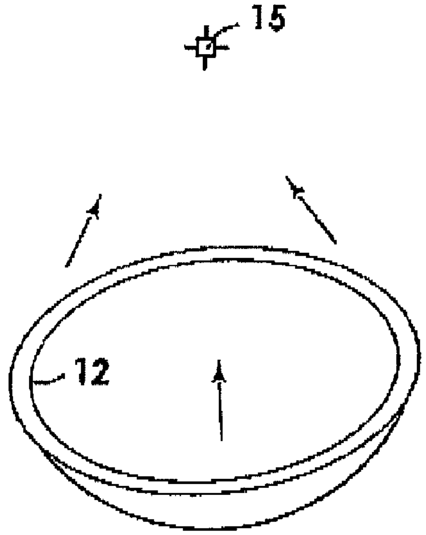
FIG. 1A is a perspective view of a radiator in accordance with the present invention.
Figure 1B:
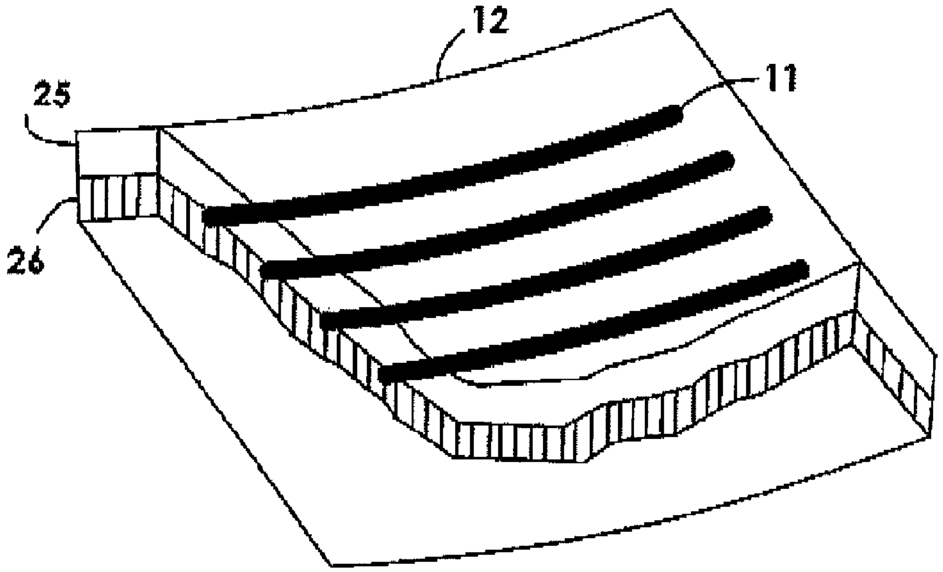
FIG. 1B is a perspective view of a portion of the radiator of FIG. 1A showing three different layers where a portion of the thermal conductive layer and a portion of the thermal insulation layer are removed for viewing purpose.
Figure 1C:
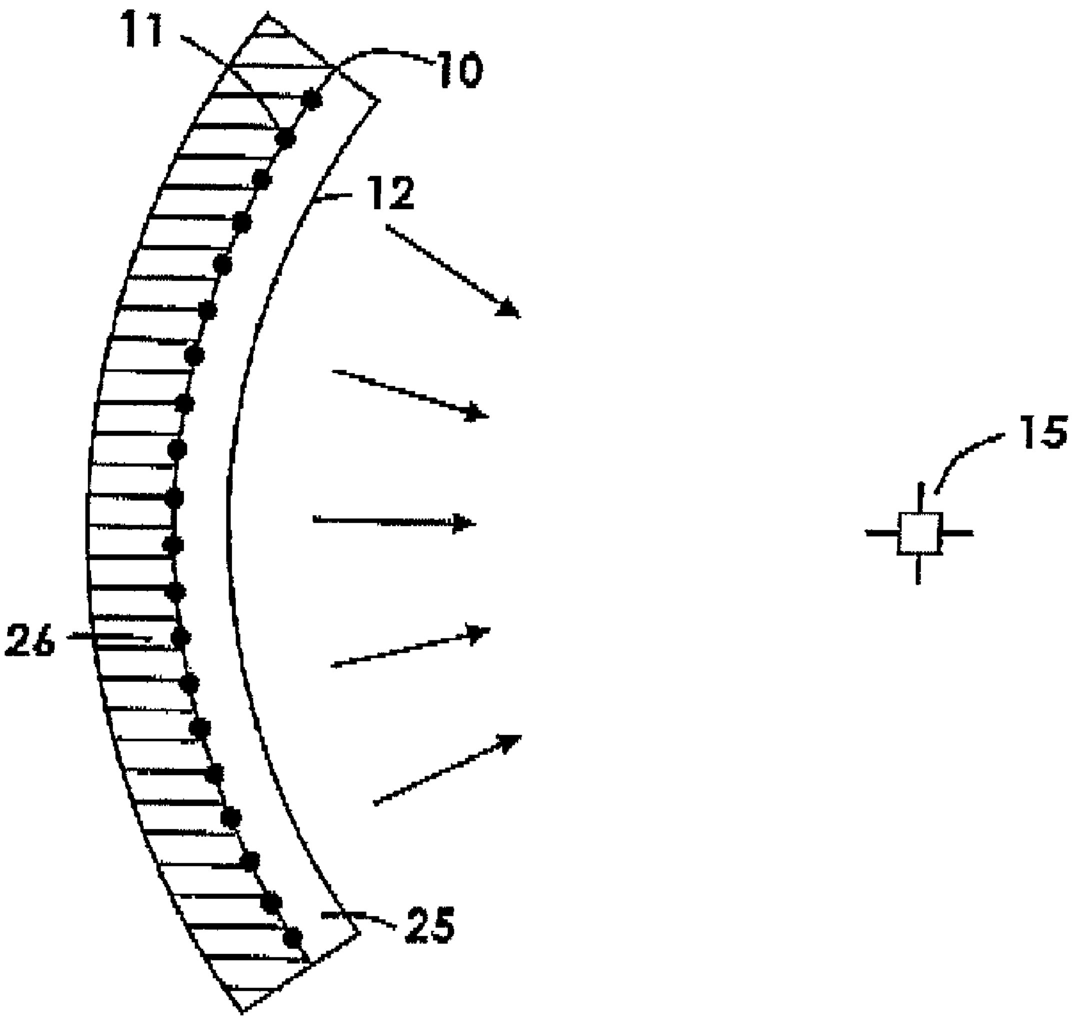
FIG. 1C is a side cross-sectional view of the radiator of FIG. 1A.

DETAILED DESCRIPTION OF THE INVENTION (A) One embodiment of such a device is shown in FIG. 1A and FIG. 1B in which radiation source 10 is positioned on the convex surface of a segment of a hollow partial spherical or semispherical body (collectively, “Spherical Segment” or “Spherical Member”) 12. The radiation source 10 is constructed with electrical coil resistance or other heating elements 11 embedded in and surrounded by electricity insulation and thermal conductive materials 25 (including, but without limitation, electro fused magnesium oxide) on the one side facing the convex surface of spherical segment 12 and thermal insulation materials 26 on the other side. Radiation source 10 may comprise of any device or apparatus capable of increasing the surface temperature of the spherical segment 12 to the suitable levels and infrared radiation is emitted from the concave side of the spherical segment 12 and is focused or concentrated at or towards the center point or focal zone 15 of the spherical segment 12 as shown in FIG. 1C. Examples of such radiation source 10 include, wire heating elements, heating cartridges, quartz encased wire heaters and devices alike. The intensity of the radiation at the center point or focal zone 15 of the spherical segment 12 will depend on the amount or level of infrared radiation that can be or are required to be emitted from the elements or materials on, or comprising or forming (structurally or superficially) the concave surface of the spherical segment 12 and on the distance between the concave surface of the spherical segment 12 and the object upon which the infrared radiation is to be focused or concentrated. Such elements or materials can be selected from a group consisting of stainless steel, low carbon steel, aluminum, aluminum alloys, aluminum-iron alloys, chromium, molybdenum, manganese, nickel, niobium, silicon, titanium, zirconium, rare-earth minerals or elements (including, without limitation, cerium, lanthanum, neodymium and yttrium), and ceramics, nickel-iron alloys, nickel-iron-chromium alloys, nickel-chromium alloys, nickel-chromium-aluminum alloys, and other alloys alike and oxides, sesquioxides, carbides and nitrides whereof, certain carbonaceous materials and other infrared radiating materials. In one aspects of the invention, this embodiment is theoretically equivalent to numerous infinitesimal sources of infrared radiation evenly spaced over the concave surface of the spherical segment 12 and each pointing, emitting, focusing or concentrating infrared radiation at or towards the center point or focal zone 15 of the spherical segment 12.

Figure 2A:
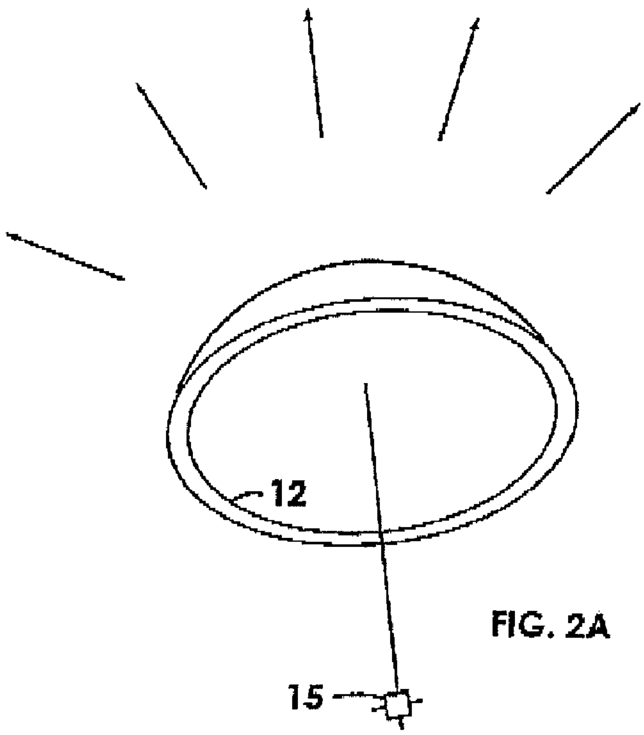
FIG. 2A is a perspective view of a radiator in accordance with the present invention.
Figure 2B:
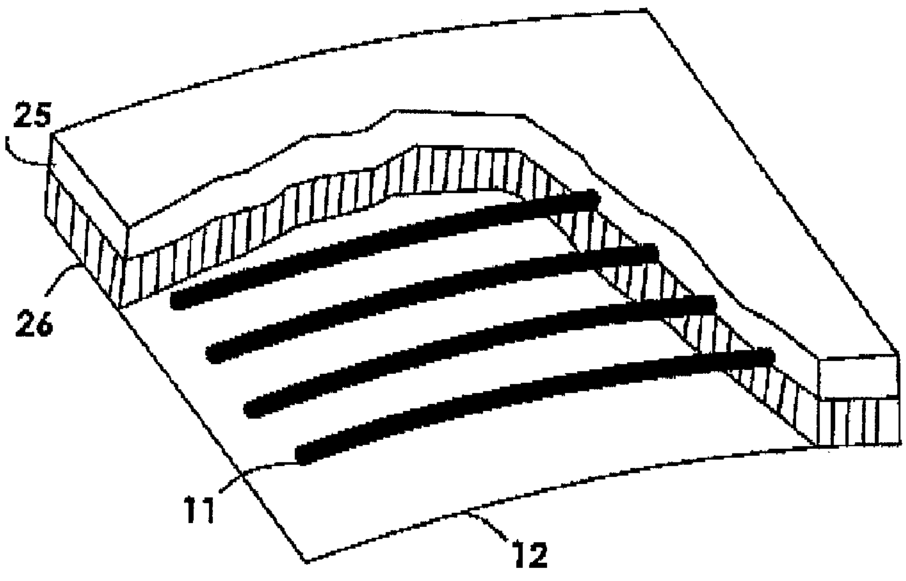
FIG. 2B is a perspective view of a portion of the radiator of FIG. 2A showing three different layers where a portion of the thermal conductive layer and a portion of the thermal insulation layer are removed for viewing purpose.
Figure 2C:
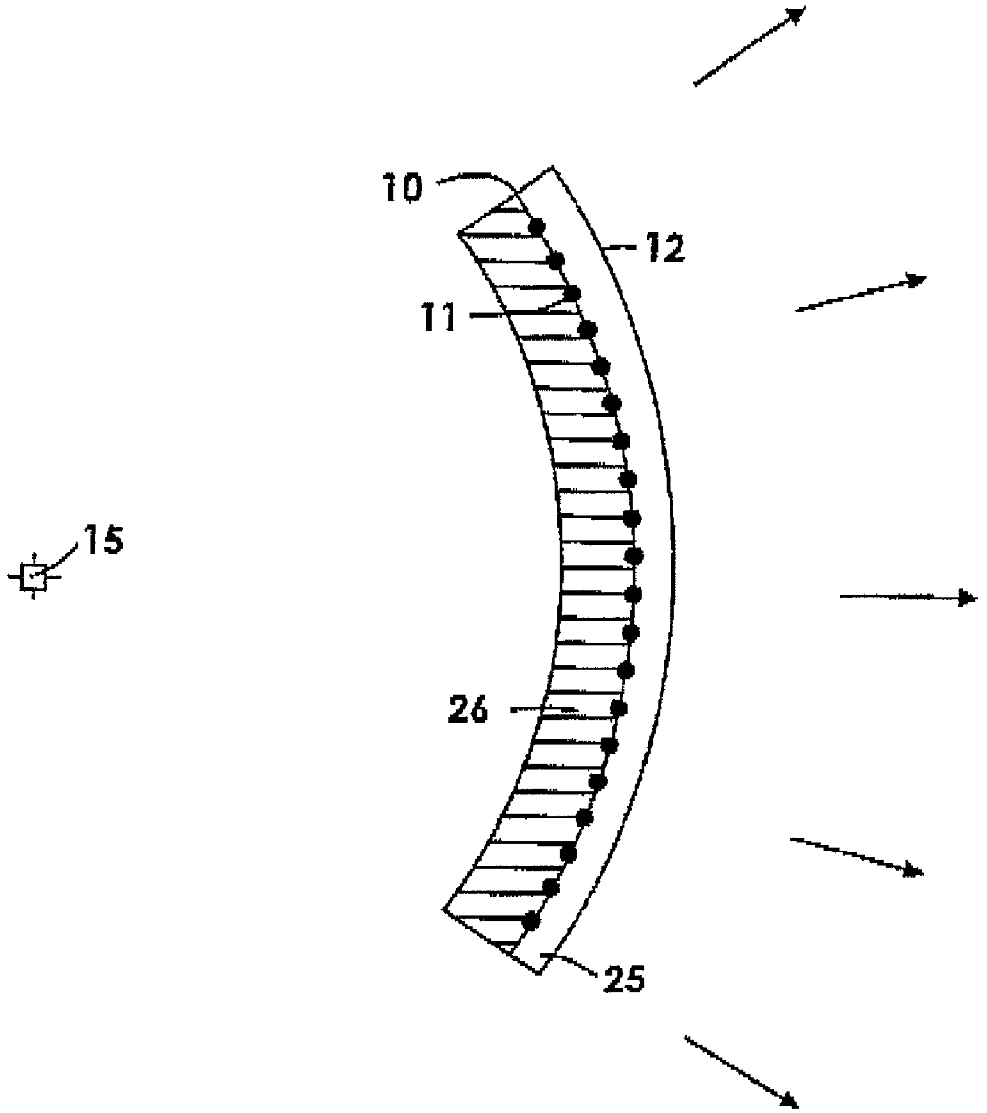
FIG. 2C is a side cross-sectional view of the radiator of FIG. 2A.

(B) One embodiment of such a device is shown in FIG. 2A and FIG. 2B in which radiation source 10 is positioned on the concave surface of the spherical segment or spherical member 12. The radiation source 10 is constructed with electrical coil resistance or other heating elements 11 embedded in and surrounded by electricity insulation and thermal conductive materials 25 (including, but without limitation, electro fused magnesium oxide) on the one side facing the concave surface of spherical segment 12 and thermal insulation materials 26 on the other side. The radiation source 10 may comprise of any device or apparatus capable of increasing the surface temperature of the spherical segment 12 to the suitable levels and infrared radiation is emitted from the convex side of the spherical segment 12 and is distributed or dispersed away from the center point or focal zone 15 of the spherical segment 12 as shown in FIG. 2C. Examples of such radiation source 10 include, wire heating elements, heating cartridges, quartz encased wire heaters and devices alike. The intensity of the radiation at the center point or focal zone 15 of the spherical segment 12 will depend on the amount or level of infrared radiation that can be or are required to be emitted from the elements or materials on, or comprising or forming (structurally or superficially) the convex surface of the spherical segment 12 and on the distance between the convex surface of the spherical segment 12 and the object upon which the infrared radiation is to be focused or concentrated. Examples of such elements or materials include stainless steel, ceramic, nickel-iron-chromium alloys and other alloys alike and oxides, sesquioxides, carbides and nitrides whereof, certain carbonaceous materials and other infrared radiating materials. In one aspects of the invention, this embodiment is theoretically equivalent to numerous infinitesimal sources of infrared radiation evenly spaced over the convex surface of the spherical segment 12 and each pointing, emitting and distributing or dispersing infrared radiation away from the center point or focal zone 15 of the spherical segment 12.

Figure 3:
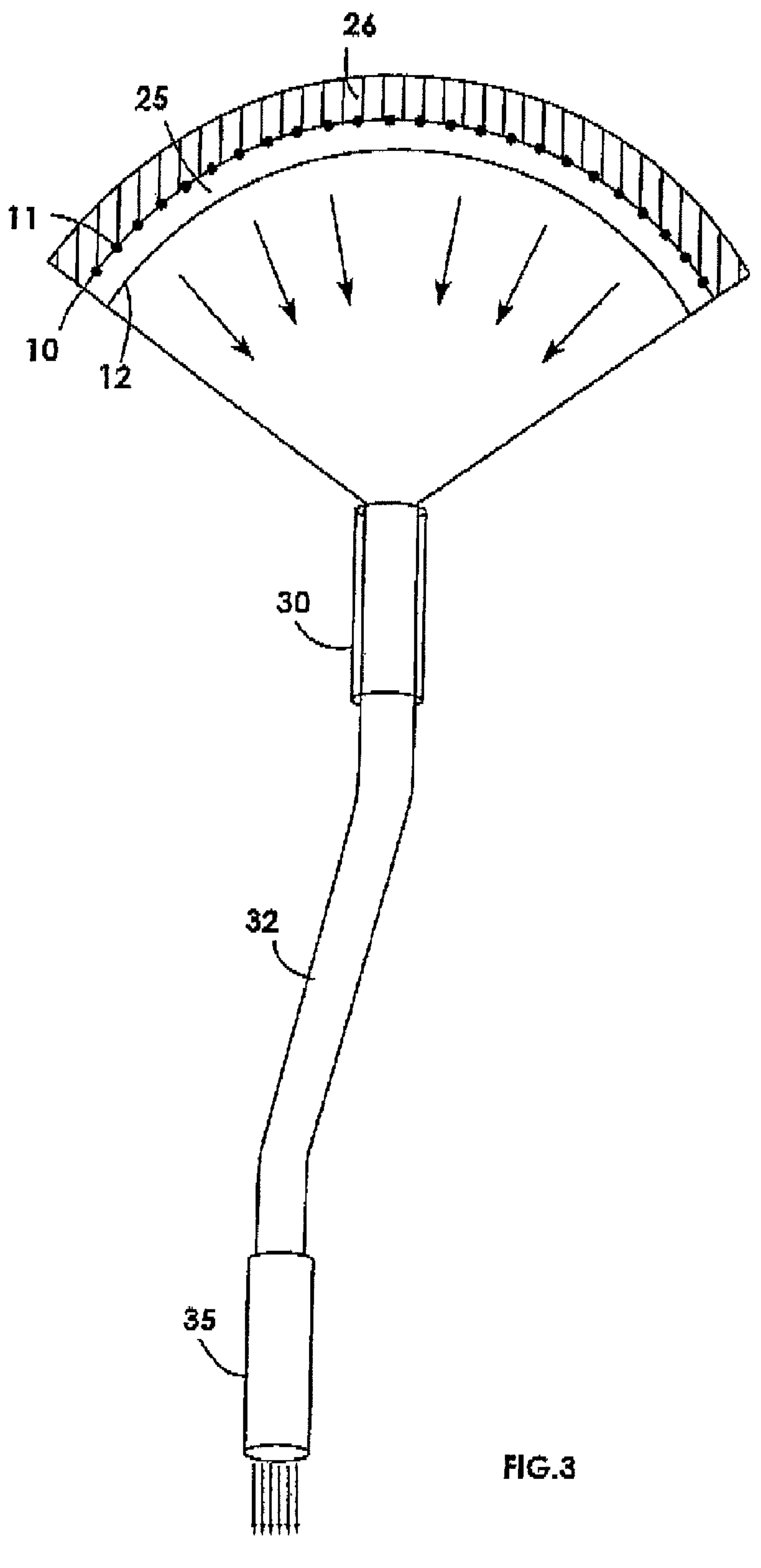
FIG. 3 is a side cross-sectional view of the radiator of FIG. 1A with a fiber optic apparatus and a lens optic apparatus.

(C) One embodiment of such a device is shown in FIG. 3 in which radiation source 10 is positioned on the convex surface of the spherical segment 12. The radiation source 10 is constructed with electrical coil resistance or other heating elements 11 embedded in and surrounded by electricity insulation and thermal conductive materials 25 (including, but without limitation, electro fused magnesium oxide) on the one side facing the convex surface of spherical segment 12 and thermal insulation materials 26 on the other side. In such device, an end of fiber optic bundle 32 or apparatus (collectively, "fiber optic apparatus") 30 or optical lens (including, but without limitation, a prism), mirrors, reflective surfaces or a hybrid, permutation or combination whereof (collectively, "lens optic apparatus") 35 is placed or positioned at the center point or focal zone 15 of the spherical segment 12 at which end of the relevant apparatus the infrared radiation is focused or concentrated and from which end of the relevant apparatus the infrared radiation is transmitted through the fiber optic apparatus 30 or lens optic apparatus 35 or a hybrid, permutation or combination whereof. Examples of such apparatuses include medical equipment or apparatuses whereby infrared radiation is focused or concentrated at or towards, or directed to, the places where such infrared radiation is need for operations or treatments, drying, warming, heating, sanitizing and/or sterilizing of equipment, apparatuses, bodies or body tissues (living or dead) or materials, and for and in connection with eradication, reduction or control of diseases, bacterial or virus infections or epidemics, or other syndromes or conditions. Industrial or commercial applications for infrared radiation apparatuses include (without limitation) drying, thermoforming, warming, heating (including, without limitation, therapeutic, relaxation and comfort heating), laminating, welding, curing, fixing, manufacturing, tempering, cutting, shrinking, coating, sealing, sanitizing, sterilizing, embossing, evaporating, setting, incubating, baking, browning, food warming, and/or actions of nature on and/or in respect of objects, surfaces, products, substances and matters.

(D) In another embodiment, mobile, portable or handheld infrared torches, optic fibers, guides, leaders or apparatuses of similar nature, or hybrids, permutations or combinations whereof, can be utilized, exploited or implemented by which infrared radiation is focused or concentrated at or towards, or directed to, the selected areas, zones, bodies or body tissues (living or dead), objects, substances or matters (including, but without limitation, food and other materials) desired to be heated or irradiated, or to or by which energy by or from an external radiation source 10 is intended to be irradiated, transferred or absorbed.

Figure 4A:
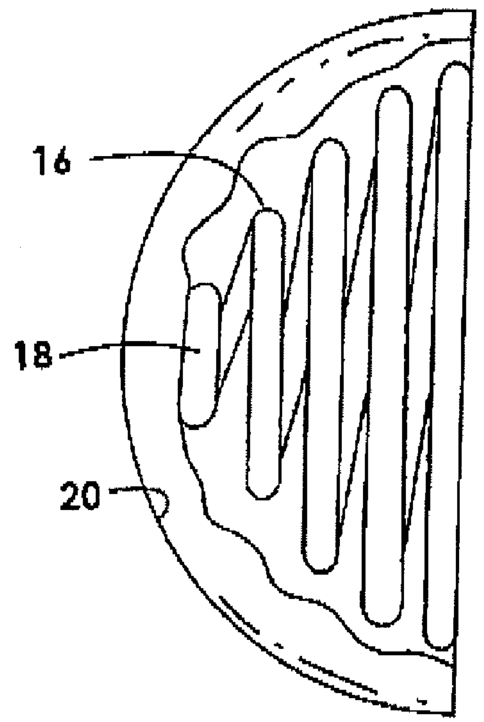
FIG. 4A is side view of a radiator in accordance with the present invention where a portion of the reflection member is removed for viewing purpose.
Figure 4B:
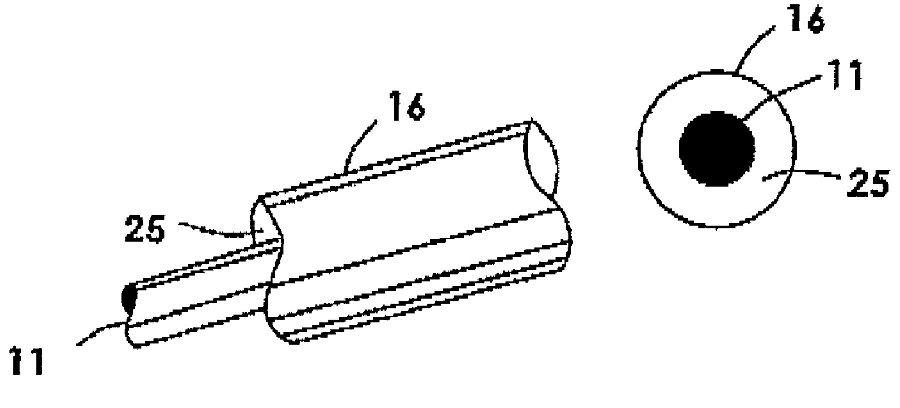
FIG. 4B is a perspective view and a side cross-sectional view of a radiation member of the radiator of FIG. 4A.
Figure 4C:
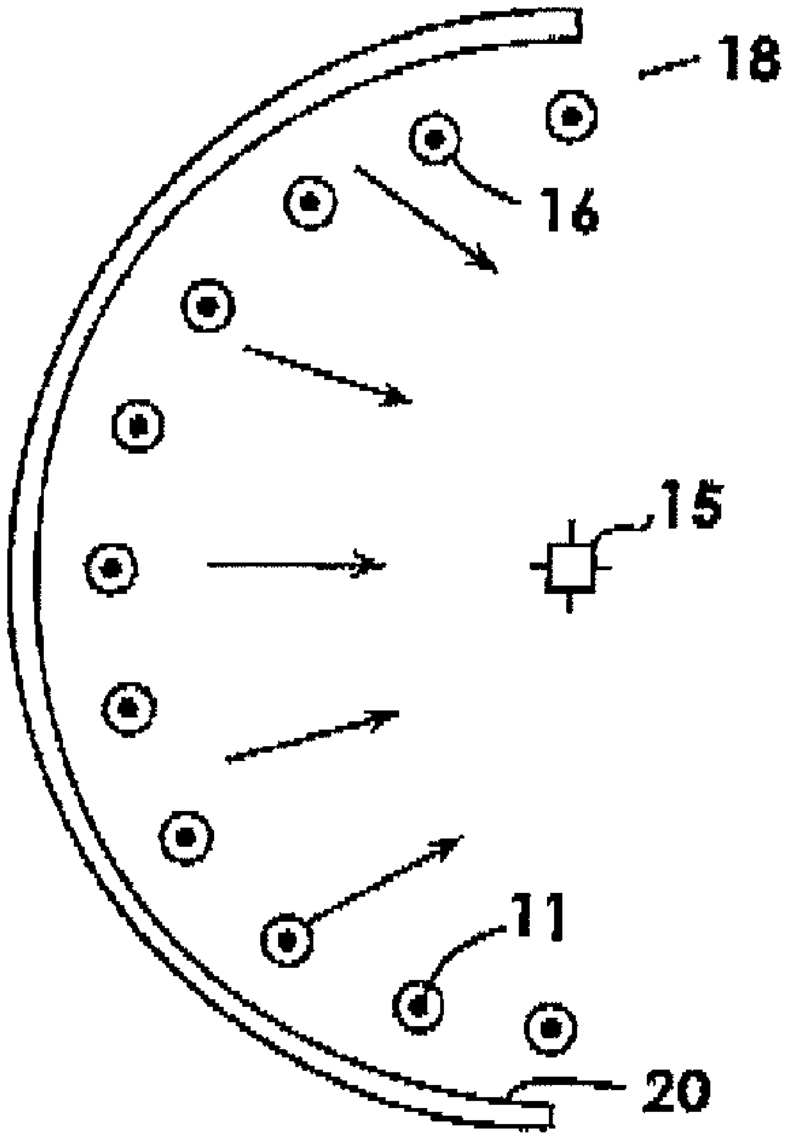
FIG. 4C is a side cross-sectional view of the radiator of FIG. 4A.

(E) One embodiment of such a device is shown in FIG. 4A in which the radiation source 10 is in the form of a helical dome-shaped structure (having a generally circular, triangular, rectangular, polygonal or elliptical base and a generally semispherical or quasi-semispherical shape) 18. The radiation source 10 is constructed with electrical coil resistance or other heating elements embedded in and surrounded by electricity insulation and thermal conductive materials 25 (including, but without limitation, electro fused magnesium oxide) in tubular casing 16 as shown in FIG. 4B (comprises one or more materials or matters selected from a group consisting of stainless steel, low carbon steel, aluminum, aluminum alloys, aluminum-iron alloys, chromium, molybdenum, manganese, nickel, niobium, silicon, titanium, zirconium, rare-earth minerals or elements (including, without limitation, cerium, lanthanum, neodymium and yttrium), and ceramics, nickel-iron alloys, nickel-iron-chromium alloys, nickel-chromium alloys, nickel-chromium-aluminum alloys, and other alloys alike and oxides, sesquioxides, carbides and nitrides whereof, or a mixture alloys or oxides, sesquioxides, carbides, hydrates or nitrates whereof, certain carbonaceous materials and other infrared radiating materials) bent into a helical dome-shaped structure (having a generally circular, triangular, rectangular, polygonal or elliptical base and a generally semispherical or quasi-semispherical shape) 18 with the outer surface of the helical dome-shaped structure 18 confirming to a spherical segment. The radial cross-section of the tubular casing 16 as shown in FIG. 4B may take generally circular, triangular, rectangular, polygonal or elliptical shapes, or hybrids and/or combinations whereof in light of the shape of the helical dome-shaped structure with a view to maximizing the effect of the irradiation for the selected purposes. The helical dome-shaped structure 18 radiation source 10 is encased in or positioned inside a larger semispherical concave reflective surface 20 as shown in FIG. 4C to the intent that both the helical dome-shaped structure 18 radiation source 10 and the larger semispherical concave reflective surface 20 have the same center point or focal zone 15 so that the infrared radiation from the helical dome-shaped structure 18 radiation source 10 can be reflected and focused or concentrated at the same center point or focal zone 15 over a smaller area or zone.

Figure 5A:
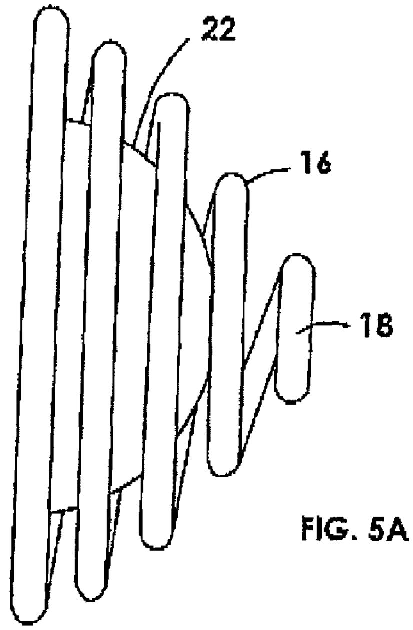
FIG. 5A is side view of a radiator in accordance with the present invention.
Figure 5B:
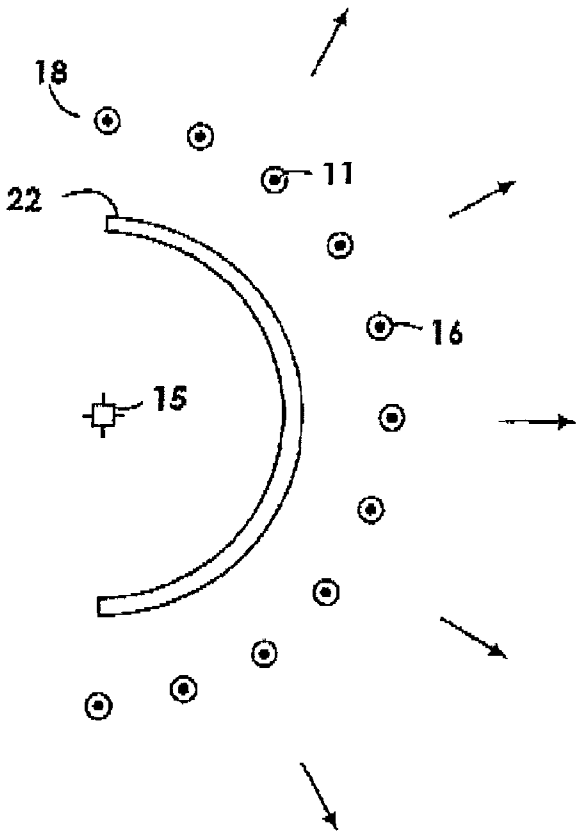
FIG. 5B is a side cross-sectional view of the radiator of FIG. 5A.

(F) One embodiment of such a device is shown in FIG. 5A in which the radiation source 10 is in the form of a helical dome-shaped structure (having a generally circular, triangular, rectangular, polygonal or elliptical base and a generally semispherical or quasi-semispherical shape) 18. The radiation source 10 is constructed with electrical coil resistance or other heating elements 11 embedded in and surrounded by electricity insulation and thermal conductive materials 25 (including, but without limitation, electro fused magnesium oxide) in tubular casing 16 as shown in FIG. 4B (comprises one or more materials or matters selected from a group consisting of stainless steel, low carbon steel, aluminum, aluminum alloys, aluminum-iron alloys, chromium, molybdenum, manganese, nickel, niobium, silicon, titanium, zirconium, rare-earth minerals or elements (including, without limitation, cerium, lanthanum, neodymium and yttrium), and ceramics, nickel-iron alloys, nickel-iron-chromium alloys, nickel-chromium alloys, nickel-chromium-aluminum alloys, and other alloys alike and oxides, sesquioxides, carbides and nitrides whereof, or a mixture alloys or oxides, sesquioxides, carbides, hydrates or nitrates whereof, certain carbonaceous materials and other infrared radiating materials) bent into a helical dome-shaped structure (having a generally circular, triangular, rectangular, polygonal or elliptical base and a generally semispherical or quasi-semispherical shape) 18 with the inner surface of the helical dome-shaped structure 18 confirming to a spherical segment 12. The radial cross-section of the tubular casing 16 as shown in FIG. 4B may take generally circular, triangular, rectangular, polygonal or elliptical shapes, or hybrids and/or combinations whereof in light of the shape of the helical dome-shaped structure with a view to maximizing the effect of the irradiation for the selected purposes. The helical dome-shaped structure 18 radiation source 10 encases or is positioned over a smaller semispherical convex reflective surface 22 as shown in FIG. 5B to the intent that both the helical dome-shaped structure 18 radiation source 10 and the smaller semispherical convex reflective surface 22 have the same center point or focal zone 15 so that the infrared radiation from the helical dome-shaped structure 18 radiation source 10 can be reflected and distributed or dispersed away from the same center point or focal zone 15 over a larger area or zone.

Figure 6:
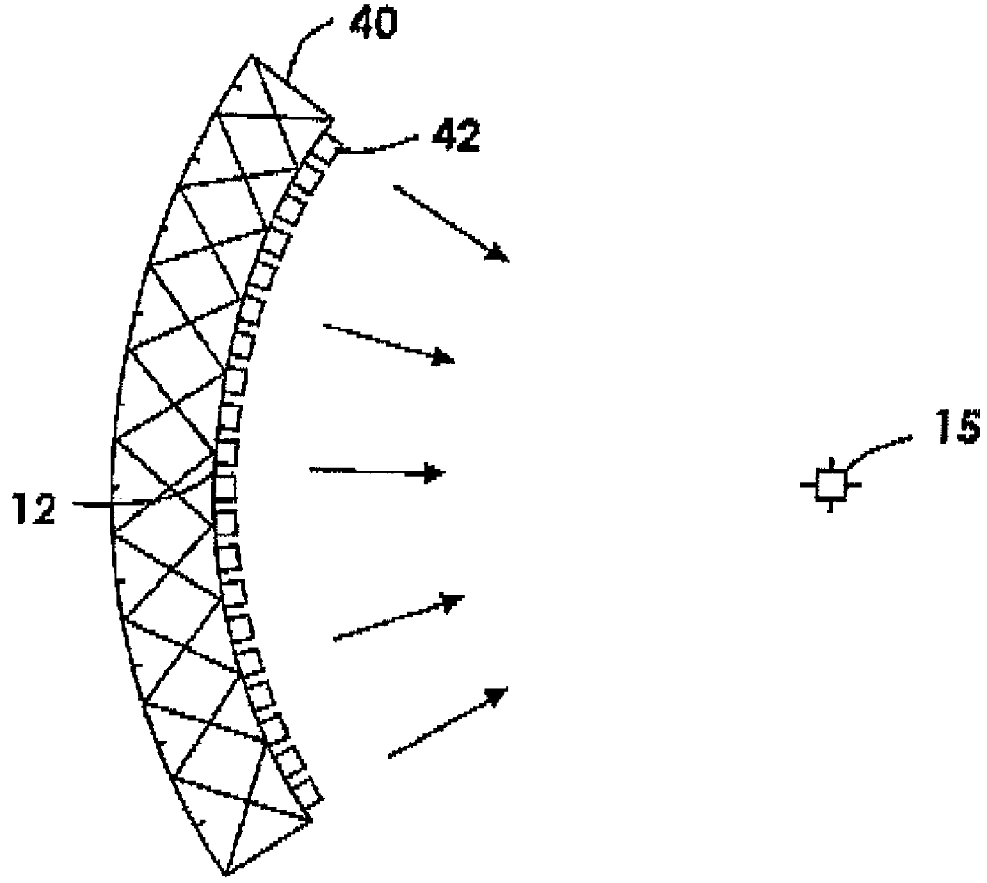
FIG. 6 is a side cross-sectional view of a radiator in accordance with the present invention.

(G) One embodiment of such a device is shown in FIG. 6 in which a larger structure 40 (which may be constructed with or by way engineering and/or other forms, trusses, brackets, structures and frameworks of light-weight metals, alloys, or other materials, substances or matters) in the shape of a spherical segment 12 is placed in the outer or deep space, whether within or beyond the atmosphere of the Earth, (generally and without limitation, referred to as the "Outer Space"). Numerous individual infrared emitting devices 42 (which may be powered by, amongst others, nuclear power or solar power energized electrical cells, batteries or other storage devices and apparatuses for electricity or forms of energy) are placed on the spherical segment 12 so that each of such devises is placed, positioned and secured in such a manner and form on the concave surface of the said spherical segment 12 structure 40 as to emit, point, direct, concentrate and focus the infrared radiation emitted from such infrared emitting devices 42 towards the center point or focal zone 15 of the spherical segment 12 on objects, bodies, substances and matters (including, but without limitation, meteorites, extra-terrestrial objects, bodies, substances and matters) placed, positioned, found or located at or near the center point or focal zone 15 or in the path of the concentrated infrared radiation. This disclosure can provide radiation or heat to and increase the temperature of any such object, body, substance and matter in the Outer Space so placed, positioned, found or located at or near the center point or focal zone 15 or in the path of the concentrated infrared radiation, and can also achieve an increase in the temperature of such object, body, substance and matter relative to its environment, or achieve a temperature differential of such object, body, substance and matter and its environment and provide thrust, torque and propulsion forces to such object, body, substance and matter for and incidental to (without limitation) alteration, modification, configuration, rotation, orientation, deflection, destruction and disintegration of such object, body, substance and matter, or initiation, alteration, modification or determination of its trend, speed, motion, movement, trajectory and/or flight path in the Outer Space. In another aspect or object, this invention includes a device in which certain infrared emitting diodes or other devices 42 are generally placed, positioned and secured on the concave surface of the spherical segment 12 and each pointing, emitting and concentrating infrared radiation towards the center point or focal zone 15 of the spherical segment 12 at which any body, object, substance or matter (including, but without limitation, human or other biological tissues which require treatments and/or operations for medical conditions known by those skilled in the art in, for example, alleviation or reduction of pain, discomfort and/or inflammation, improving metabolism and circulation of body fluids, refractory or post-amputation wounds treatments, and other medical or scientific operations, researches or studies, and food and other materials) may be placed.

Figure 7:
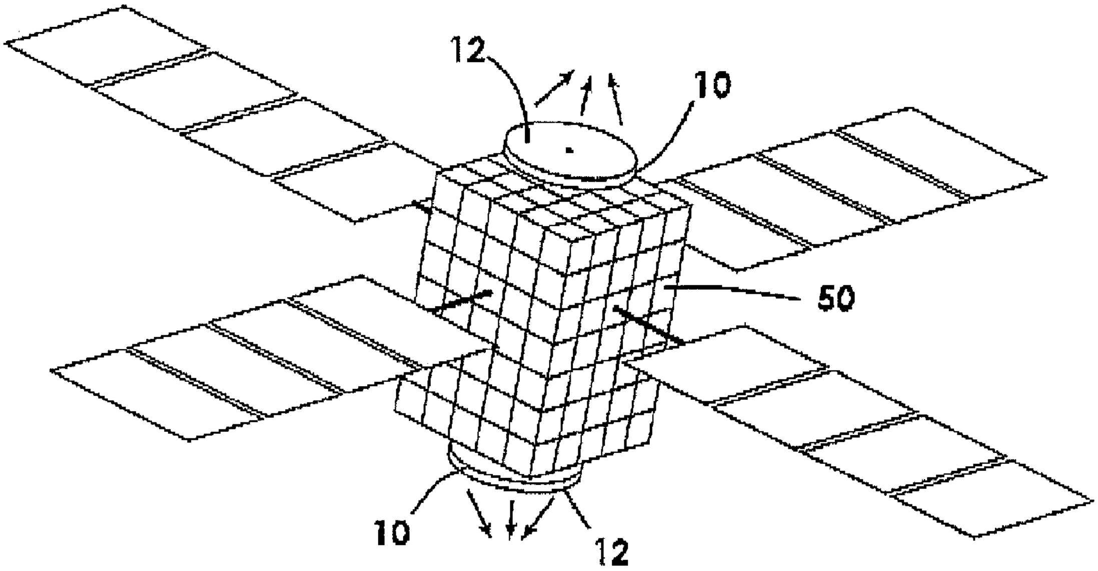
FIG. 7 is a perspective view of an astronomic apparatus having a radiator of the present invention.

(H) One embodiment of such a device is shown in FIG. 7 in which radiation sources 10 positioned on the convex surface of the spherical segment 12 are assembled, installed, erected, constructed, located or placed on satellites or other astronomic equipment and/or apparatuses 50 in Outer Space as shown in FIG. 7 for focusing, concentrating or directing radiation to or at a selected area or zone of absorbent surface to achieve an increase in the temperature of such a selected area or zone of absorbent surface relative to its environment or to achieve a temperature differential of said selected area or zone and its environment and provide thrust, torque and propulsion forces for and incidental to (amongst other things) matters of attitude of such satellites or other astronomic equipment and/or apparatuses 50 in Outer Space relative to the Sun or other extra-terrestrial body or bodies, or for focusing, concentrating or directing radiation to or at any object, body, substance and matter (including, but without limitation, meteorites, extra-terrestrial objects, bodies, substances and matters) for and incidental to (without limitation) alteration, modification, configuration, rotation, orientation, deflection, destruction and disintegration of such object, body, substance and matter, or initiation, alteration, modification or determination of its trend, speed, motion, movement, trajectory and/or flight path in the Outer Space.

Figure 8A:
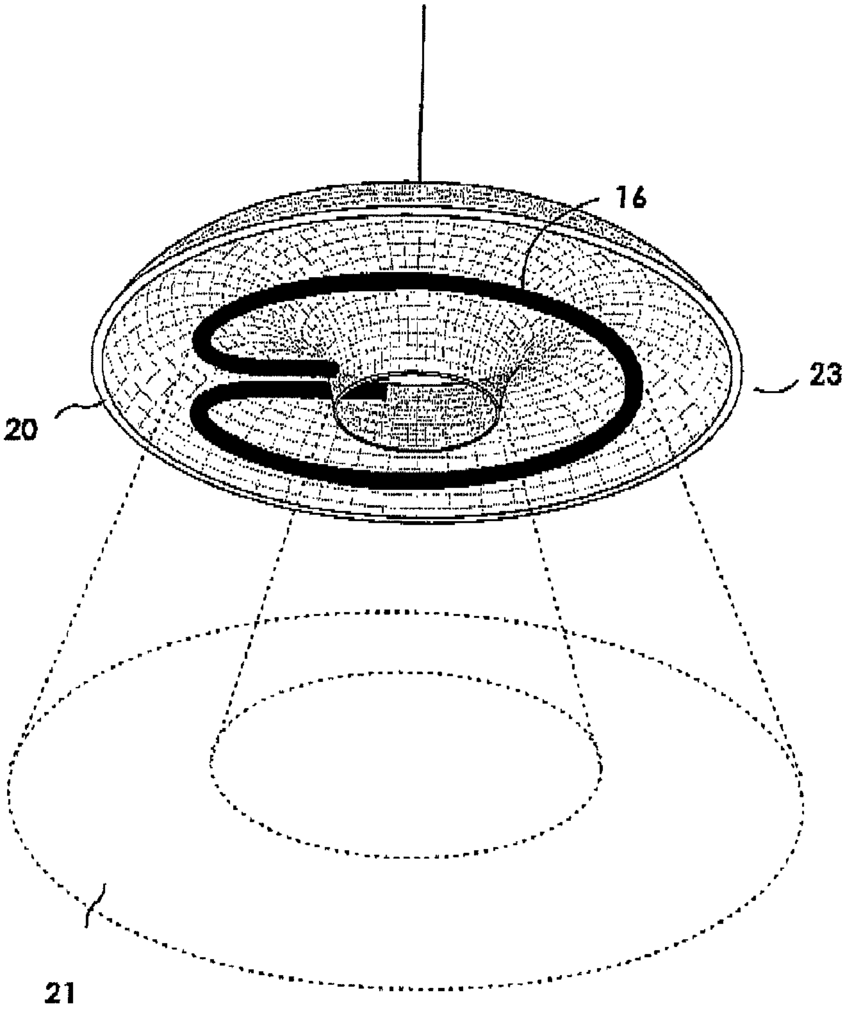
FIG. 8A is a perspective view of a radiator in accordance with the present invention.
Figure 8B:
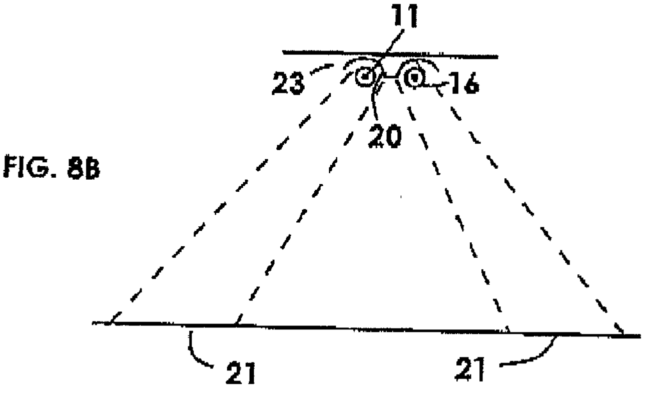
FIGS. 8B, 8C and 8D are side cross-sectional views of the radiator of FIG. 8A.
Figure 8C:
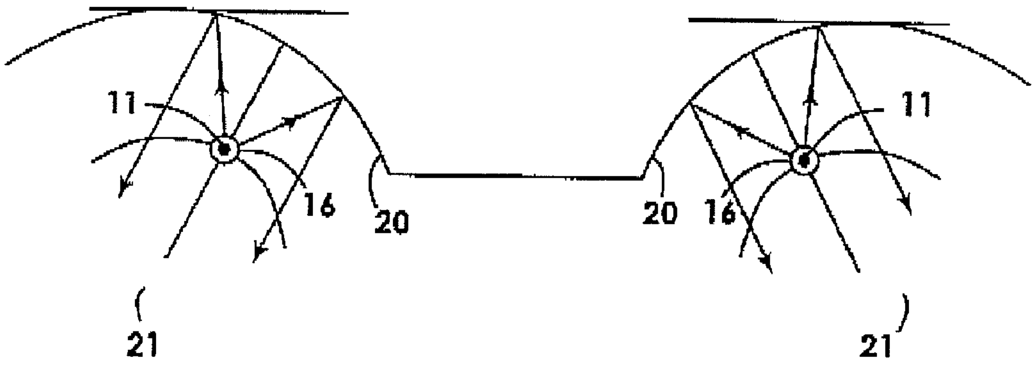
Figure 8D:
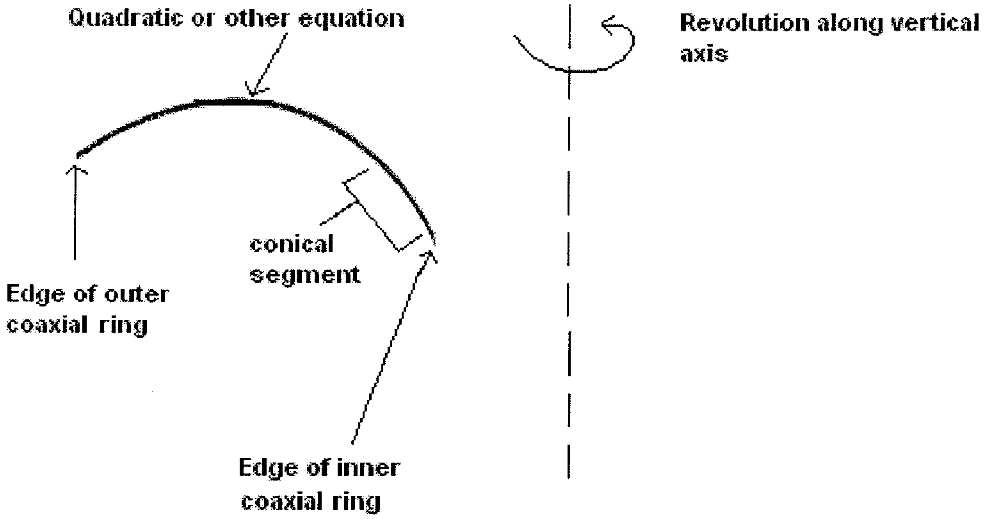

(I) One embodiment of such a device is shown in FIG. 8A and FIG. 8B in which a radiation source 10 constructed with electrical coil resistance or other heating elements 11 embedded in and surrounded by electricity insulation and thermal conductive materials 25 (including, but without limitation, electro fused magnesium oxide) in tubular casing 16 as shown in FIG. 4B (comprises one or more materials or matters selected from a group consisting of stainless steel, low carbon steel, aluminum, aluminum alloys, aluminum-iron alloys, chromium, molybdenum, manganese, nickel, niobium, silicon, titanium, zirconium, rare-earth minerals or elements (including, without limitation, cerium, lanthanum, neodymium and yttrium), and ceramics, nickel-iron alloys, nickel-iron-chromium alloys, nickel-chromium alloys, nickel-chromium-aluminum alloys, and other alloys alike and oxides, sesquioxides, carbides and nitrides whereof, or a mixture alloys or oxides, sesquioxides, carbides, hydrates or nitrates whereof, certain carbonaceous materials and other infrared radiating materials) is placed before a generally circular hat-shaped or ring- shaped reflective element 23 constructed of good reflective materials, including, but without limitation, gold (emissivity=0.02), polished aluminum (emissivity=0.05), oxidized aluminum (emissivity=0.15), in the form as shown in FIG. 8A, the end(s) or terminal(s) of the radiation source 10 being turned towards and passing through aperture (s) on the concave reflective surface 20 and stowed and secured at appropriate location(s) within the recess(es) behind the concave reflective surface 20 (with desirable and appropriate safety features known by those skilled in the art), so that a point on the radiation source 10 facing the generally circular hat- shaped or ring-shaped reflective element 23 is positioned at or near the center point or focal zone of the corresponding segment of the concave reflective surface 20 of the generally circular hat-shaped or ring-shaped reflective element 23 and the infrared radiation emitted from such point on the radiation source is directed or reflected away from the concave reflective surface 20 substantially in the manner as shown in FIG. 8C. The radial cross-section of the tubular casing 16 as shown in FIG. 4B may take generally circular, triangular, rectangular, polygonal or elliptical shapes, or hybrids and/or combinations whereof in light of the shape of the generally circular hat-shaped or ring-shaped reflective element with a view to maximizing the effect of the irradiation for the selected purposes. The concave reflective surface 20 of the generally circular hat-shaped or ring-shaped reflective element 23 may be conic (being spherical, paraboloidal, ellipsoidal, hyperboloidal) or other surfaces that can be generated from revolution, or in other manner, of quadratic or other equations. The radiation emitted from the generally circular hat-shaped or ring-shaped reflective element 23 is concentrated mainly within the irradiated zone 21 as shown in FIG. 8A and FIG. 8B for the purposes of heating or irradiating bodies, objects, substances or matters (including, but without limitation, food and other materials) placed or found within the irradiated zone 21, with a view to saving or maximizing the efficient use of energy emitted from the radiation source and whilst reducing or minimizing the effect of radiation on other bodies, objects, substances or matter (including, but without limitation, food and other materials) not within the irradiated zone 21 as shown in FIG. 8A and FIG. 8B. See also FIG. 8D.

Figure 9A:
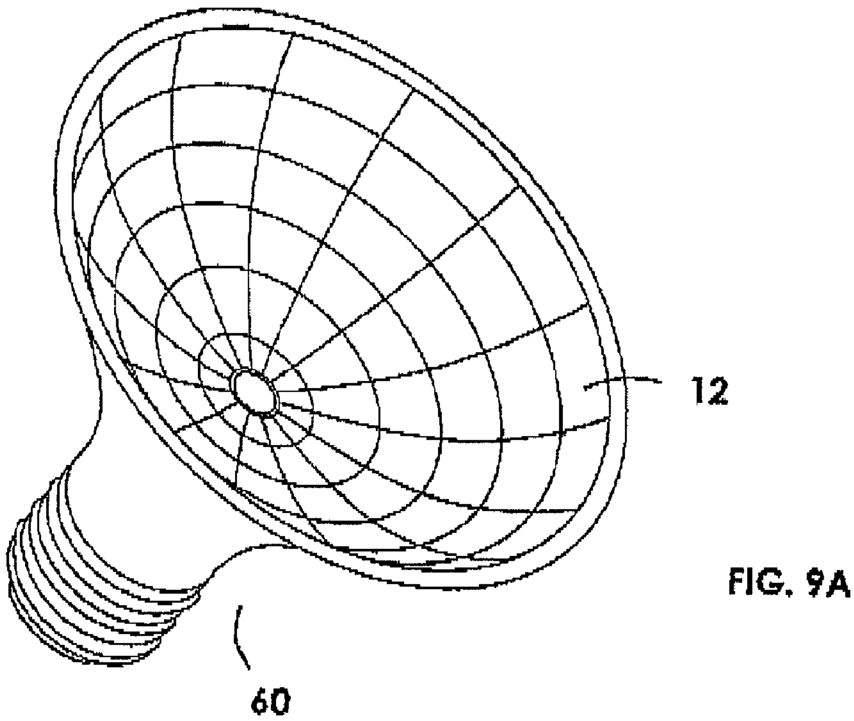
FIG. 9A is a perspective view of the radiator of FIG. 1A with a light bulb base.
Figure 9B:
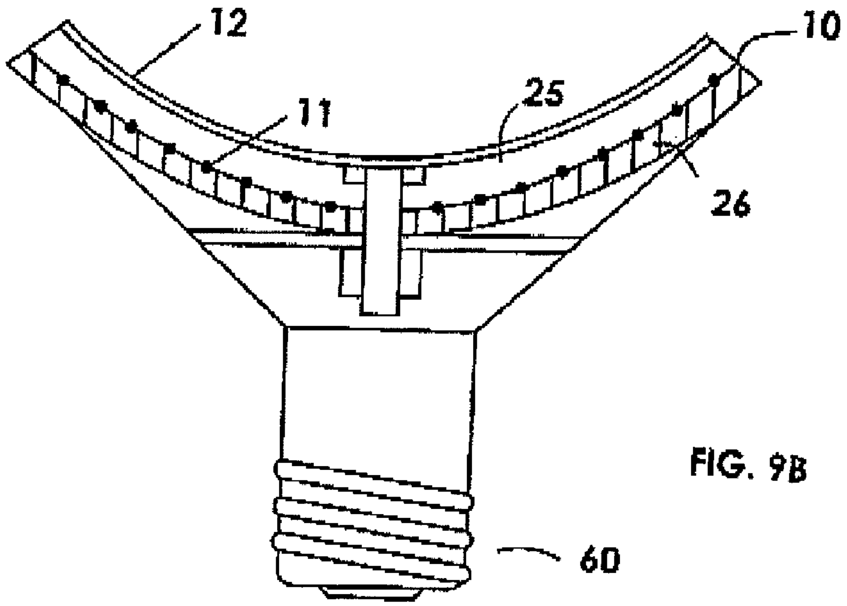
FIG. 9B is a side cross-sectional view of the radiator and the light bulb base of FIG. 9A.

(J) One embodiment of such a device is shown in FIG. 9A, which includes a device coupled with an externally threaded light bulb assembly 60 with a longitudinal axis through the center point or focal zone 15 of the spherical segment 12. The radiation source 10 is constructed with electrical coil resistance or other heating elements 11 embedded in and surrounded by electricity insulation and thermal conductive materials 25 (including, but without limitation, electro fused magnesium oxide) on the one side facing the convex surface of spherical segment 12 and thermal insulation materials 26 on the other side. It is an object of the invention that this embodiment (with desirable and appropriate safety features known by those skilled in the art) will thread into an electrical lamp socket designed for receiving such devise with its accompanying light bulb assembly 60. Such a device comprises a radiation source 10 positioned on the convex surface of the spherical segment 12 and an externally threaded screw base conforming to that of a standard light bulb, which screw base is accepted by an electrical lamp socket in a manner as if it were an electrical light bulb. Radiation source 10 may comprise of any device or apparatus capable of increasing the surface temperature of the spherical segment 12 to the suitable levels and infrared radiation is focused or concentrated at or towards the center point or focal zone 15 of the spherical segment 12 over a smaller area or zone as shown in FIG. 9B.

Figure 10A:
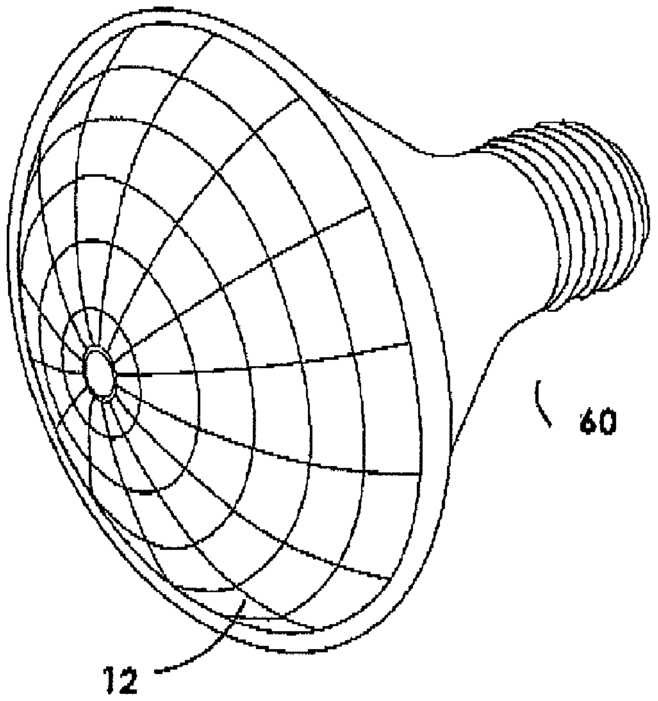
FIG. 10A is a perspective view of the radiator of FIG. 2A with a light bulb base.
Figure 10B:
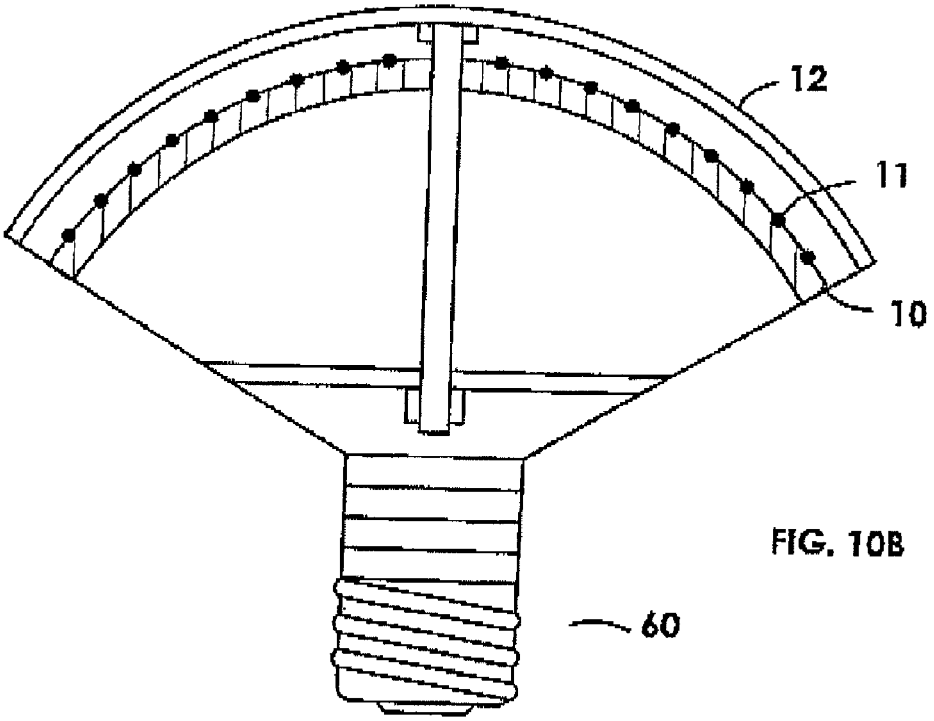
FIG. 10B is a side cross-sectional view of the radiator and the light bulb base of FIG. 9A.

(K) One embodiment of such a device is shown in FIG. 10A, which includes a device coupled with an externally threaded light bulb assembly 60 with a longitudinal axis through the center point or focal zone 15 of the spherical segment 12. The radiation source 10 is constructed with electrical coil resistance or other heating elements 11 embedded in and surrounded by electricity insulation and thermal conductive materials 25 (including, but without limitation, electro fused magnesium oxide) on the one side facing the concave surface of spherical segment 12 and thermal insulation materials 26 on the other side. It is an object of the invention that this embodiment (with desirable and appropriate safety features known by those skilled in the art) will thread into an electrical lamp socket designed for receiving such devise with its accompanying light bulb assembly 60. Such a device comprises a radiation source 10 positioned on the concave surface of the spherical segment 12 and an externally threaded screw base conforming to that of a standard light bulb, which screw base is accepted by an electrical lamp socket in a manner as if it were an electrical light bulb. Radiation source 10 may comprise of any device or apparatus capable of increasing the surface temperature of the spherical segment 12 to the suitable levels and infrared radiation is distributed or dispersed away from the center point or focal zone 15 of the spherical segment 12 over a larger area or zone as shown in FIG. 10B.

Those of skill in the art are fully aware that, numerous hybrids, permutations, modifications, variations and/or equivalents (for example, but without limitation, certain aspects of spherical bodies, shapes and/or forms are applicable to or can be implemented on paraboloidal, ellipsoidal and/or hyperboloidal bodies, shapes and/or forms) of the present invention and in the particular embodiments exemplified, are possible and can be made in light of the above invention and disclosure without departing from the spirit thereof or the scope of the claims in this disclosure. It is important that the claims in this disclosure be regarded as inclusive of such hybrids, permutations, modifications, variations and/or equivalents. Those of skill in the art will appreciate that the idea and concept on which this disclosure is founded may be utilized and exploited as a basis or premise for devising and designing other structures, configurations, constructions, applications, systems and methods for implementing or carrying out the gist, essence, objects and/or purposes of the present invention.

In regards to the above embodiments, diagrams and descriptions, those of skill in the art will further appreciate that the optimum dimensional or other relationships for the parts of the present invention and disclosure, which include, but without limitation, variations in sizes, materials, substances, matters, shapes, scopes, forms, functions and manners of operations and inter-actions, assemblies and users, are deemed readily apparent and obvious to one skilled in the art, and all equivalent relationships and/or projections to or of those illustrated in the drawing figures and described in the specifications are intended to be encompassed by, included in, and form part and parcel of the present invention and disclosure. Accordingly, the foregoing is considered as illustrative and demonstrative only of the ideas or principles of the invention and disclosure. Further, since numerous hybrids, permutations, modifications, variations and/or equivalents will readily occur to those skilled in the art, it is not desired to limit the invention and disclosure to the exact functionality, assembly, construction, configuration and operation shown and described, and accordingly, all suitable hybrids, permutations, modifications, variations and/or equivalents may be resorted to, falling within the scope of the present invention and disclosure.

It is to be understood that the present invention has been described in detail as it applies to infrared radiation in the foregoing for illustrative purposes, without limitation of application of the present invention to radio-waves, micro-waves, ultra-violet waves, x-rays, gamma rays and all other forms of radiation within or outside the electromagnetic spectrum except as it may be limited by the claims.

What is claimed is:

1. A radiator including:

at least one radiation member powered by an energy source, wherein the radiation member includes an at least partial ring shape;

a reflection member including an at least partially circular hat-shaped channel concave reflective surface defined by at least two coaxial rings or partial rings;

the inner coaxial ring or partial ring defines an at least partially conical segment forming part of the reflection member protruding or rising from the bottom of the reflective member and located at or near the center of the reflection member and disposed at least partially within the at least partial ring formed by the radiation member, the radial cross-section of the reflective member including an at least partial parabolic, hyperbolic or conic shape defining a focal area or focal areas and at least a point or portion on or of the boundary of the radial cross-section touches the coaxial ring or partial ring;

the reflective surface of the at least partially circular hat-shaped concave reflective member is generated from rotation or revolution of the radial cross-section of the reflective member along an axis outside of the radial cross-section and located at the center of the inner coaxial ring or partial ring and perpendicular to the plane formed by the inner coaxial ring or partial ring in three-dimensional space, wherein the reflective surface defines an at least partially longitudinal and at least partially circular focal zone running along a portion of the length of the at least partially circular hat-shaped concave reflective member;

at least a portion of the radiation member runs at, near or along at least a portion of the length of partially circular hat-shaped concave reflective member at, near or along the at least partially longitudinal and at least partially circular focal zone;

at least a portion of the radiation member is turned towards and passes through an aperture or apertures on the at least partially conical segment of the reflection member and stowed or secured within at least a recess of or behind the at least partially conical segment of the reflection member.

2. The radiator of claim 1, wherein the conical segment has its axis perpendicular to the plane in three-dimensional space of the at least partial ring formed by the radiation member.

3. The radiator of claim 1, wherein the radiation member includes a ceramic or carbonaceous material or an oxide, carbide, hydrate or nitrate of silicon material or metallic material.

4. The radiator of claim 1, wherein the radiation member includes an electrical coil resistance encased in a ceramic or carbonaceous material or an oxide, carbide, hydrate or nitrate of silicon material or metallic material.

5. The radiator of claim 1, wherein at least a terminal of the radiation member is turned towards and passes through an aperture or apertures on at least partially conical segment of the reflective member and stowed or secured within at least a recess of or behind the at least partially conical segment of the reflective member.

6. The radiator of claim 1, wherein the radiation member includes an electrical coil resistance covered by a thermal conductive material.

7. The radiator of claim 1, wherein the radiation member includes an at least partial tubular shape.

8. The radiator of claim 1, wherein the radiation member has a generally ring shape.

* * * * *